United States Patent
Jensen et al.

(10) Patent No.: US 9,444,990 B2
(45) Date of Patent: Sep. 13, 2016

(54) SYSTEM AND METHOD FOR SETTING FOCUS OF DIGITAL IMAGE BASED ON SOCIAL RELATIONSHIP

(71) Applicant: Sony Corporation, Tokyo (JP)

(72) Inventors: Mathias Jensen, Lund (SE); Vishal Kondabathini, Lund (SE); Sten Wendel, Lund (SE); Stellan Nordström, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 63 days.

(21) Appl. No.: 14/332,664

(22) Filed: Jul. 16, 2014

(65) Prior Publication Data
US 2016/0021293 A1    Jan. 21, 2016

(51) Int. Cl.
*G06K 9/00* (2006.01)
*H04N 5/232* (2006.01)
*G06F 17/30* (2006.01)
*G06K 9/62* (2006.01)

(52) U.S. Cl.
CPC ...... *H04N 5/23212* (2013.01); *G06F 17/3028* (2013.01); *G06K 9/00255* (2013.01); *G06K 9/00288* (2013.01); *G06K 9/00671* (2013.01); *G06K 9/00677* (2013.01); *G06K 9/6267* (2013.01)

(58) Field of Classification Search
CPC .............. H04N 5/23212; H04N 5/23219; G06K 9/00677
See application file for complete search history.

(56) References Cited

U.S. PATENT DOCUMENTS

| | | | |
|---|---|---|---|
| 2008/0118156 A1* | 5/2008 | Okada | G06K 9/00228 382/195 |
| 2010/0040356 A1 | 2/2010 | Ishikawa | |
| 2013/0169853 A1* | 7/2013 | Luong | H04N 5/23206 348/345 |

FOREIGN PATENT DOCUMENTS

WO    2013025354    2/2013

OTHER PUBLICATIONS

David Pogue: "Face Recognition" In: "David Pogue's Digital Photography: The Missing Manual", Jan. 14, 2009, O'Reilly Media, Inc., 1005 Gravenstein Highway North, Sebastopol, pp. 21-21.
Zhang Chao et al: "Extended depth-of-field via focus stacking and graph cuts", 2013 IEEE International Conference on Image Processing, IEEE, Sep. 15, 2013, pp. 1272-1276.
PCT/IB2015/055330; PCT International Search Report and Written Opinion of the International Searching Authority mailed Oct. 27, 2015.

* cited by examiner

*Primary Examiner* — Ahmed A Berhan
(74) *Attorney, Agent, or Firm* — Renner, Otto, Boisselle & Sklar, LLP

(57) ABSTRACT

The present disclosure provides a system and method of setting the focus of a digital image based on social relationship. In accordance with embodiments of the present disclosure, a scene is imaged with an electronic device and a face present in the imaged scene is detected. An identity of an individual having the detected face is recognized by determining that the detected face is the face of an individual having a social relationship with the user of the electronic device. The focus of the image is set to focus on the face of the recognized individual.

20 Claims, 6 Drawing Sheets

SYSTEM AND METHOD FOR SETTING FOCUS OF DIGITAL IMAGE BASED ON SOCIAL RELATIONSHIP

TECHNICAL FIELD OF THE INVENTION

The technology of the present disclosure relates generally to facial detection and recognition in a digital image, and more particularly, to a system and method for setting the focus of a digital image based on social relationship.

BACKGROUND

Mobile wireless electronic devices are becoming increasingly popular. For example, mobile telephones and tablets are now in wide-spread use. These electronic devices are often highly integrated with the day-to-day happenings of a user. For example, many electronic devices include a camera, and a user of the electronic device may use the camera to capture digital images of various activities and events.

It is commonplace for digital images captured on an electronic device to include images of individuals with whom the user of the electronic device may share a social relationship (e.g., friends, family, co-workers, etc.). Software applications and methods exist for detecting and focusing on faces present in an image to be captured. The hope with implementing face detection may be that the captured image will be focused on the intended subject (i.e., an individual). However, face detection is performed without regard to the electronic device user's social relationship with the individuals present in the image. This may result in undesirous imaging effects for a captured digital image.

SUMMARY

The present disclosure provides a system and method for setting a focus of a digital image based on social relationship to a user of the electronic device. In accordance with the present disclosure, facial detection and social relationship are collectively utilized to set the focus of a digital image. By tying the focus of the image to individuals sharing a social relationship with the user of the electronic device, images captured by the electronic device may have a greater probability of being focused on the intended subject of the image. Also, by recognizing the individuals present in the digital image together with the social relationship of the individuals to the user, it may be easier for the user of the electronic device to share the image with those individuals on appropriate social media service(s).

According to one aspect of the disclosure, a method of setting a focus of a digital image based on social relationship to a user of an electronic device includes: imaging a scene with a camera of the electronic device; detecting, with a processing device of the electronic device, a face present in an imaged scene; recognizing an identity of an individual having the detected face by determining, with the processing device, that the detected face is the face of an individual having a social relationship with the user of the electronic device; setting, with the processing device, the focus of the camera to focus on the face of the recognized individual; and capturing, with the camera, the digital image with the focus on the face of the recognized individual.

In some embodiments, the identity of the individual having the detected face is recognized using a database of social relationships stored on the electronic device.

In some embodiments, the identity of the individual having the detected face is recognized using a database of social relationships stored on a social media server, and the determining includes: sending an identity request from the electronic device to the social media server, the identity request including information of the detected face; and receiving at the electronic device an identity response from the social media server, the identity response including the identity of the individual having the detected face.

In some embodiments, the method further includes storing the identity of the recognized individual as metadata to the digital image.

In some embodiments, a plurality of faces is detected in the imaged scene and the identity of the individual is recognized as having a face from among the plurality of detected faces.

In some embodiments, the method further includes recognizing an identity of an additional individual as having another face from among the plurality of faces.

In some embodiments, the method further includes: setting an additional focus of the camera to focus on the face of the additional recognized individual; and capturing an addition digital image with the focus on the face of the additional recognized individual.

In some embodiments, the method further includes combining the digital image and the additional digital image to create an image with focus on the face of the recognized individual and focus on the face of the additional recognized individual.

In some embodiments, the method includes prioritizing the recognized individuals, wherein the focus of the camera is set to focus on the face of the prioritized recognized individual; and the digital image is captured with the focus on the face of the prioritized recognized individual.

In some embodiments, the method includes displaying on the imaged scene proximate the detected face, information relating to the social relationship between the recognized individual and a user of the electronic device.

According to another aspect of the disclosure, a method of setting a focus of a digital image based on social relationship to a user of an electronic device includes: imaging a scene with a camera of the electronic device; detecting, with a processing device of the electronic device, a plurality of faces present in the imaged scene; capturing one or more digital images with a camera of the electronic device, each digital image focused on at least one of the detected faces; recognizing an identity of an individual having one of the detected faces by determining, with the processing device, that the detected face is the face of an individual having a social relationship with the user of the electronic device; and setting the focus from among the one or more digital images to focus on the face of the recognized individual.

In some embodiments, the identity of the individual having one of the detected faces is recognized using a database of social relationships stored on the electronic device.

In some embodiments, the identity of the individual having one of the detected faces is recognized using a database of social relationships stored on a social media server, and the determining includes: sending an identity request from the electronic device to the social media server, the identity request including information of the detected faces; and receiving at the electronic device an identity response from the social media server, the identity response including the identity of the individual having one of the detected faces.

In some embodiments, the method further includes storing the identity of the recognized individual as metadata to the digital image.

In some embodiments, the method further includes recognizing an identity of an additional individual as having another face from among the plurality of faces.

In some embodiments, the capturing includes capturing a plurality of digital images with the camera; and the setting the focus includes combining the plurality of digital images to create an image with focus on the face of the recognized individual and on the face of the additional recognized individual.

In some embodiments, the method further includes displaying on the imaged scene proximate the detected face, information relating to the social relationship between the recognized individual and a user of the electronic device.

According to another aspect of the disclosure, an electronic device includes: a camera; and a processing device that executes a digital imaging function configured to set a focus of a digital image based on social relationship to a user of an electronic device by: imaging a scene with the camera; detecting a face present in an imaged scene; recognizing an identity of an individual having the detected face by determining that the detected face is the face of an individual having a social relationship with the user of the electronic device; setting the focus of the camera to focus on the face of the recognized individual; and capturing, with the camera, the digital image with the focus on the face of the recognized individual.

In some embodiments, the identity of the individual having the detected face is recognized using a database of social relationships stored on the electronic device.

In some embodiments, a plurality of faces is detected in the imaged scene, the identity of the individual is recognized as having a face from among the plurality of detected faces, and an identity of an additional individual is recognized as having another face from among the plurality of faces, the digital imaging function further configured to: set an additional focus of the camera to focus on the face of the additional recognized individual; capture an addition digital image with the focus on the face of the additional recognized individual; and combine the digital image and the additional digital image to create an image with focus on the face of the recognized individual and on the face of the additional recognized individual.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

DETAILED DESCRIPTION OF EMBODIMENTS

Figure 1:
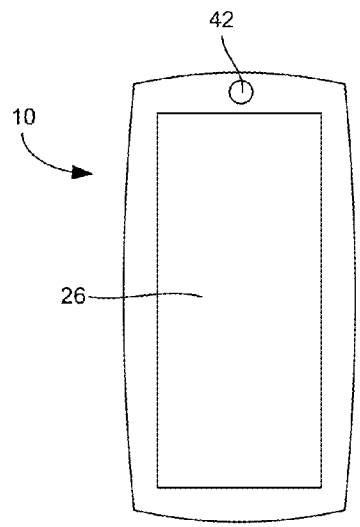
FIG. 1 is a schematic view of a mobile telephone as an exemplary electronic device.

In the description that follows, like components have been given the same reference numerals, regardless of whether they are shown in different embodiments. To illustrate an embodiment(s) of the present invention in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

Figure 2:
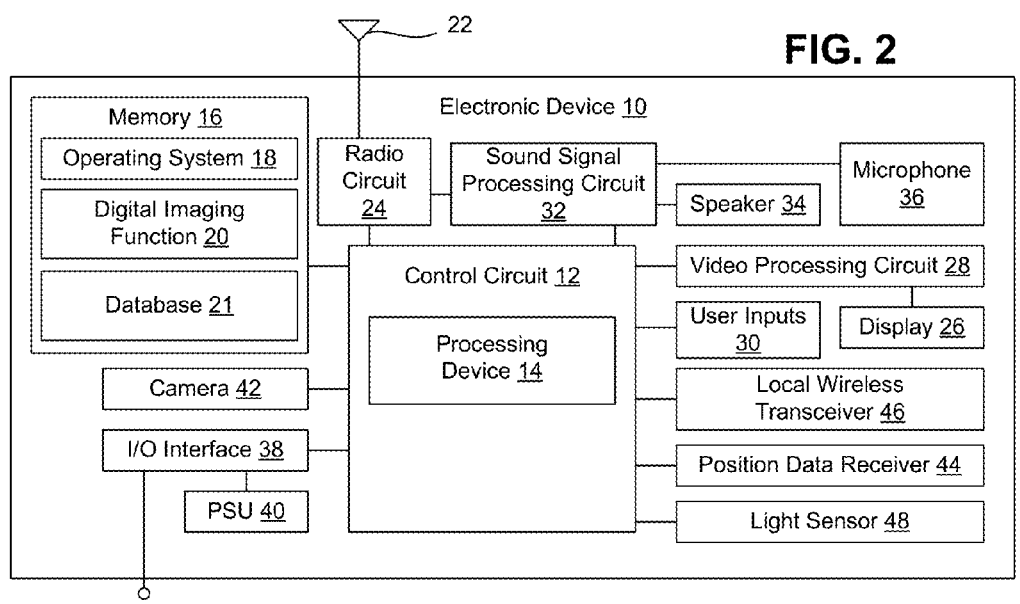
FIG. 2 is a schematic block diagram of the exemplary electronic device of FIG. 1.

Referring initially to FIGS. 1 and 2, an electronic device is shown at 10. The electronic device of the illustrated embodiment is a mobile telephone and will be referred to as the electronic device 10. It will be appreciated that, while embodiments described herein are described primarily in the context of a portable radio communications device such as the illustrated mobile telephone, the exemplary context of a mobile telephone is not the only operational environment in which aspects of the disclosed systems and methods may be used. The techniques described in this document may be applied to any type of appropriate electronic device, examples of which include a mobile telephone, a tablet computing device, a media player, a gaming device, a laptop or desktop computer, a video telephone, an electronic organizer, a personal digital assistant (PDA), a camera, a camcorder, etc.

The electronic device 10 may include a control circuit 12 that is configured to carry out overall control of the functions and operations of the electronic device 10. The control circuit 12 may include a processing device 14, such as a central processing unit (CPU), microcontroller, or microprocessor. The processing device 14 executes code stored in a memory (not shown) within the control circuit 12 and/or in a separate memory, such as the memory 16, in order to carry out operation of the electronic device 10. For example, the processing device 14 may execute an operating system 18 and a digital imaging function 20. In the example shown, the operating system 18 and the digital imaging function 20 are stored on the memory 16. In other examples (not shown), the operating system 18 and/or the digital imaging function 20 may be stored in a memory within the control circuit 12.

The operating system 18 and the digital imaging function 20 may be embodied in the form of executable logic routines (e.g., lines of code, software programs, etc.) that are stored on a non-transitory computer readable medium (e.g., the memory 16) of the electronic device 10 and are executed by the control circuit 12 (e.g., using the processing device 14). Furthermore, the operating system 18 and/or the digital imaging function 20 may be a stand-alone software application or form a part of a software application (e.g., a part of the operating system 18) that carries out additional tasks related to the electronic device 10. Also, through the following description, exemplary techniques for focusing a digital image based on social relationship are described. It will be appreciated that through the description of the exemplary techniques, a description of operations that may be carried out in part by executing software is described. The described operations may be considered a method that the corresponding device is configured to carry out. Also, while the digital imaging function 20 is implemented in software in accordance with an embodiment, such functionality could also be carried out via dedicated hardware or firmware, or some combination of hardware, firmware and/or software.

The operating system 18 may be executed by the processing device 14 to control the allocation and usage of resources in the electronic device 10, as well as provide basic user interface features. Specifically, the operating system 18 may control the allocation and usage of the memory 16, the processing time of the processing device 14 dedicated to various applications being executed by the processing device 14, as well as performing other functionality. In this manner, the operating system 18 may serve as the foundation on which applications, such as the digital imaging function 20 depend as is generally known by those with ordinary skill in the art. The operating system 18 also may control much of the user interface environment presented to a user, such as features of the overall graphical user interface (GUI) for the electronic device.

The digital imaging function 20 may be configured control a camera of the electronic device to image and capture one or more digital images. Accordingly, the digital imaging function 20 may be configured to image and capture a scene with a camera of the electronic device. When the scene includes one or more recognized individuals, the digital imaging function may be configured to set the focus of the digital image based on a social relationship of the one or more individuals to the user of the electronic device.

In some embodiments, the digital imaging function 20 may be configured to set the focus of an image to be captured. Accordingly, the digital imaging function 20 may be configured to detect a face present in the imaged scene (as imaged by the camera) and recognize an identity of a individual having the detected face by determining that the detected face is the face of an individual having a social relationship with the user of the electronic device. The digital imaging function 20 may further be configured to display the imaged scene on a display of the electronic device, which may allow a user of the electronic device to confirm and/or remove any recognized identities. Upon an instruction to capture the digital image, the digital imaging function may further be configured to set the focus of the camera to focus on the face of the recognized individual, and capture the digital image with the focus on the face of the recognized individual.

In other embodiments, the digital imaging function 20 may be configured to set the focus of a captured digital image. Accordingly, the digital imaging function 20 may be configured to detect a plurality of faces present in an imaged scene, and capture one or more digital images with a camera of the electronic device, each digital image focused on at least one of the detected faces. The digital imaging function 20 may further be configured to recognize an identity of an individual having the detected face by determining that the detected face is the face of an individual having a social relationship with the user of the electronic device. The digital imaging function may further be configured to display the image on a display of the electronic device, which may allow a user of the electronic device to confirm and/or remove any recognized identities. The digital imaging function may further be configured to set the focus from among the one or more digital images to focus on the face of the recognized individual.

The digital imaging function may further be configured to share the image (e.g., with the recognized individuals and/or on a social media service).

While the digital imaging function 20 is described herein as performing each of the above operations, it will be appreciated that the digital imaging function 20 may include one or more modules, each module configured to perform one or more dedicated functions. For example, while not specifically shown, the digital imaging function 20 may include an image display function configured to display an image to be captured or a captured image on the display, an image capture function configured to capture an image, a face detection function configured to detect a face present in an imaged scene, an identity function configured to recognize an identity of an individual having a detected face, a focusing function configured to set the focus of the image on the face of the recognized individual, and/or sharing function configured to share the focused image with the recognized individual. Additional details and operation of the digital imaging function 20 will be described in greater detail below.

The memory 16 may be, for example, one or more of a buffer, a flash memory, a hard drive, a removable media, a volatile memory, a non-volatile memory, a random access memory (RAM), or other suitable device. In a typical arrangement, the memory 16 may include a non-volatile memory for long term data storage and a volatile memory that functions as system memory for the control circuit 12. The memory 16 may exchange data with the control circuit 12 over a data bus. Accompanying control lines and an address bus between the memory 16 and the control circuit 12 also may be present. The memory 16 is considered a non-transitory computer readable medium.

The memory 16 may store a database 21 of individuals that are socially related to the user of the electronic device 10. The database 21 may be established, populated, and/or updated in accordance with the user's activity on one or more social media services. For example, the database 21 may include a listing of individuals categorized as the user's "friends" or "followers" on the one or more social media services. In addition, the database 21 may include information of such individuals, such as the specific relationship of the individual to the user (e.g., friend, family member, co-worker, etc.), photos of the individual, associated facial features of the individual, a listing of the social media services on which the individual and the user are connected, bibliographic data of the individual, and the like. The database 21 may alternatively or additionally be established, populated, and/or updated in accordance with data entered directly by the user of the electronic device 10.

The electronic device 10 includes communications circuitry that enables the electronic device 10 to establish communications with another device. Communications may include calls, data transfers, and the like. Calls may take any suitable form such as, but not limited to, voice calls and video calls. The calls may be carried out over a cellular circuit-switched network or may be in the form of a voice over Internet Protocol (VoIP) call that is established over a packet-switched capability of a cellular network or over an alternative packet-switched network (e.g., a network compatible with IEEE 802.11, which is commonly referred to as WiFi, or a network compatible with IEEE 802.16, which is commonly referred to as WiMAX), for example. Data transfers may include, but are not limited to, receiving streaming content (e.g., streaming audio, streaming video, etc.), receiving data feeds (e.g., pushed data, podcasts, really simple syndication (RSS) data feeds), downloading and/or uploading data (e.g., image files, video files, audio files, ring tones, Internet content, etc.), receiving or sending messages (e.g., text messages, instant messages, electronic mail messages, multimedia messages), and so forth. This data may be processed by the electronic device 10, including storing the data in the memory 16, executing applications to allow user interaction with the data, displaying video and/or image content associated with the data, outputting audio sounds associated with the data, and so forth.

In the exemplary embodiment, the communications circuitry may include an antenna 22 coupled to a radio circuit 24. The radio circuit 24 includes a radio frequency transmitter and receiver for transmitting and receiving signals via the antenna 22.

Figure 3:
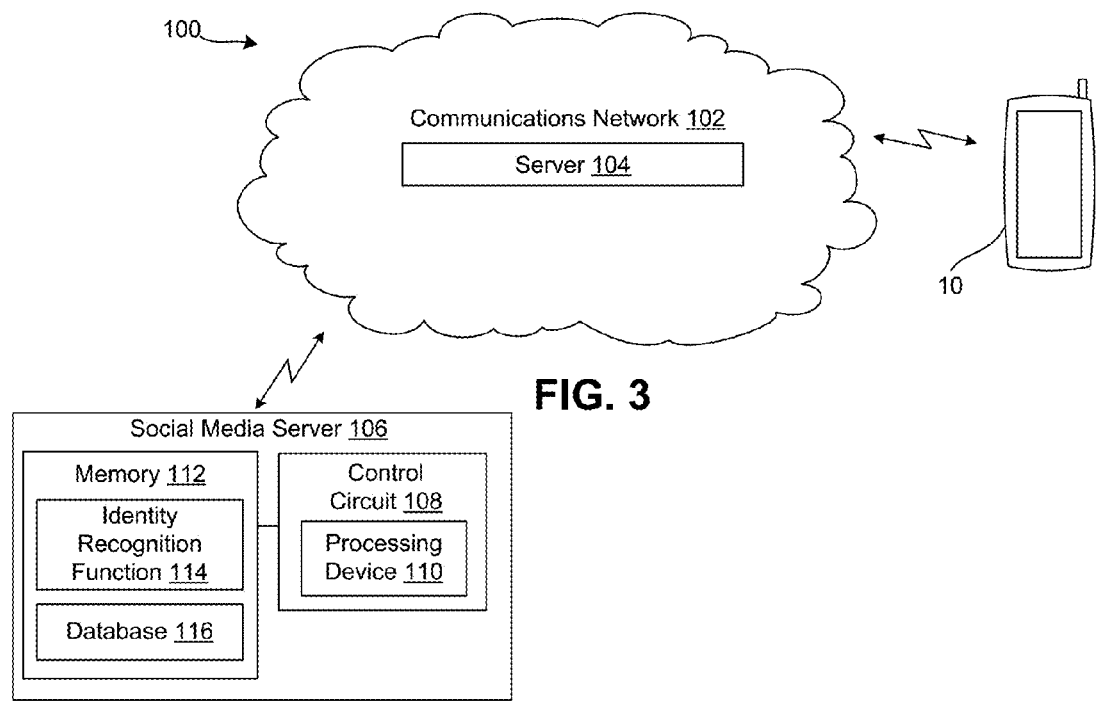
FIG. 3 is a schematic view of a communication system in which one or more electronic devices may operate.

With additional reference to FIG. 3, the radio circuit 24 may be configured to operate in a mobile communications system 100. Radio circuit types for interaction with a mobile radio network and/or broadcasting network include, but are not limited to, global system for mobile communications (GSM), code division multiple access (CDMA), wideband CDMA (WCDMA), general packet radio service (GPRS), long term evolution (LTE), WiFi, WiMAX, digital video broadcasting-handheld (DVB-H), integrated services digital broadcasting (ISDB), high speed packet access (HSPA), etc., as well as advanced versions of these standards or any other appropriate standard. It will be appreciated that the electronic device 10 may be capable of communicating using more than one standard. Therefore, the antenna 22 and the radio circuit 24 may represent one or more than one radio transceiver.

The communications system 100 may include a communications network 102 having a server 104 (or servers) for managing calls placed by and destined to the electronic device 10, transmitting data to and receiving data from the electronic device 10 and carrying out any other support functions. The server 104 communicates with the electronic device 10 via a transmission medium. The transmission medium may be any appropriate device or assembly, including, for example, a communications base station (e.g., a cellular service tower, or "cell" tower), a wireless access point, a satellite, etc. The communications network 102 may support the communications activity of multiple electronic devices and other types of end user devices. As will be appreciated, the server 104 may be configured as a typical computer system used to carry out server functions and may include a processor configured to execute software containing logical instructions that embody the functions of the server 104 and a memory to store such software.

The exemplary embodiment of the communications system 100 shown in FIG. 3 includes a social media server 106 in communication with the electronic device 10 via the communications network 102. The social media server 106 may be associated with one or more social media services. Exemplary social media services include Facebook, Myspace, Google+, Twitter, LinkedIn, and the like. The user of the electronic device 10 may have a profile or account with the one or more social media services, and access may be provided to the user's profile or account via the social media network server. The user of the electronic device 10 may interact on the social media service by performing various functions such as posting updates/commentary, uploading/downloading media content, viewing posts and/or media content from other individuals, and the like. The communications system 100 shown in FIG. 3 shows a single social media server 106. In other embodiments, other social media servers may be present, each associated with a respective social media service.

The social media server 106 may be configured as a typical computer system used to carry out several functions. The social media server 106 may include a control circuit 108 that is configured to carry out overall control of the functions and operations of the social media server 106. The control circuit 108 may include a processing device 110, such as a central processing unit (CPU), microcontroller, or microprocessor. The processing device 110 executes code stored in a memory (not shown) within the control circuit 108 and/or in a separate memory, such as the memory 112, in order to carry out operation of the social media server 106.

For example, the processing device 110 may execute the identity recognition function 114, and/or other applications. In the example shown, the identity recognition function 114 is stored on the memory 112. In other examples (not shown), the identity recognition function 114 may be stored in a memory within the control circuit 108.

The memory 112 may be, for example, one or more of a buffer, a flash memory, a hard drive, a removable media, a volatile memory, a non-volatile memory, a random access memory (RAM), or other suitable device. In a typical arrangement, the memory 112 may include a non-volatile memory for long term data storage and a volatile memory that functions as system memory for the control circuit 108. The memory 112 may exchange data with the control circuit 108 over a data bus. Accompanying control lines and an address bus between the memory 112 and the control circuit 108 also may be present. The memory 112 is considered a non-transitory computer readable medium.

The memory 112 may store a database 116 of individuals that are socially related to the user of the electronic device. The database 116 may be established and updated in accordance with the user's activity on the one or more social media services. For example, the database 116 may include a listing of individuals classified as the user's "friends" or "followers" on the social media service. In addition, the database 116 may include information of these individuals, such as the specific relationship of the individual to the user (e.g., friend, family member, co-worker, etc.), photos of the individual, associated facial features of the individual, bibliographic data of the individual, and the like.

The identity recognition function 114 may be configured to recognize the identity of an individual included in a digital image. For example, the identity recognition function 114 may receive an identity request from the digital imaging function 20 of the electronic device 10. The identity request may include an identity of a user of the electronic device 10, as well as attribute information and/or an image including one or more detected faces. The identity recognition function 114 may be configured to compare the detected one or more detected faces to individuals connected to the user on the one or more social media services (e.g., as part of a facial recognition process), and determine if one or more of the detected faces corresponds to an individual that is socially related to the user of the electronic device 10. The identity recognition function 114 may be further configured to send an identity response to the digital imaging function 20 of the electronic device 10. Additional details and operation of the identity recognition function 114 will be described in greater detail below.

In one embodiment, the identity recognition function 114 may be embodied in the form of executable logic routines (e.g., lines of code, software programs, etc.) that are stored on a non-transitory computer readable medium (e.g., the memory 36) of the social media server 106 and are executed by the control circuit 108 (e.g., using the processing device 110). Furthermore, the identity recognition function 114 may be a stand-alone software application or may form a part of a software application (e.g., a part of an operating system of the server) that carries out additional tasks related to the social media server 106. Also, while the identity recognition function 114 is implemented in software in accordance with an embodiment, such functionality could also be carried out via dedicated hardware or firmware, or some combination of hardware, firmware and/or software.

With continued reference to FIGS. 1 and 2, the electronic device 10 may include a display 26. The display 26 displays information to a user such as operating state, time, telephone numbers, contact information, incoming call information, outgoing call information, various menus, etc., that enable the user to utilize the various features of the electronic device 10. The display 26 may be used to visually display content received by the electronic device 10 and/or retrieved from a memory 16 of the electronic device 10. The display 26 may be used to present images, video, and other graphics to the user. For example, the display 26 may be used as a viewfinder that shows a scene imaged by a camera of the electronic device 10. As another example, the display 26 may be used to display an image captured by the camera of the electronic device 10. In some embodiments, the display may be a backlit liquid-crystal display (LCD), an organic light-emitting diode (OLED) display, or another suitable type of display.

The display 26 may be coupled to the control circuit 12 by a video processing circuit 28 that converts video data to a video signal used to drive the display 26. The video processing circuit 28 may include any appropriate buffers, decoders, video data processors and so forth. The video data may be generated by the control circuit 12, retrieved from a video file that is stored in the memory 16, derived from an incoming video data stream that is received by the radio circuit 24, obtained from a camera of the electronic device 10, or obtained by any other suitable method.

The electronic device 10 may include one or more user inputs 30 for receiving user input for controlling operation of the electronic device 10. Exemplary user inputs 30 include, but are not limited to, a touch input that overlays the display 26 for touch screen functionality, one or more buttons (e.g., hardware buttons), motion sensors (e.g., gyro sensors, accelerometers), and so forth.

The electronic device 10 may further include a sound signal processing circuit 32 for processing audio signals. Coupled to the sound signal processing circuit 32 are a speaker 34 and a microphone 36 that enable a user to listen and speak via the electronic device 10, and hear sounds generated in connection with other functions of the device 10. The sound signal processing circuit 32 is coupled to the control circuit 12 so as to carry out overall operation. Audio data may be passed from the control circuit 12 to the sound signal processing circuit 32 for playback to the user. The sound signal processing circuit 32 may include any appropriate buffers, decoders, encoders, amplifiers and so forth.

The electronic device 10 may further include one or more input/output (I/O) interface(s) 38. The I/O interface(s) 38 may be in the form of typical mobile telephone I/O interfaces and may include one or more electrical connectors. The I/O interfaces 38 may form one or more data ports for connecting the electronic device 10 to another device (e.g., a computer) or an accessory (e.g., a headset) via a cable. Further, operating power may be received over the I/O interface(s) 38 and power to charge a battery of a power supply unit (PSU) 40 within the electronic device 10 may be received over the I/O interface(s) 38. The PSU 40 may supply power to operate the electronic device 10 in the absence of an external power source.

The electronic device 10 may further include a camera 42. The camera 42 may be configured to image a scene and capture digital images. Image and/or video files corresponding to the images taken by the camera 42 may be stored in the memory 16. As discussed in more detail below, a focus of the digital images captured by the camera 42 may be set based on social relationship to a user of an electronic device.

The electronic device 10 also may include various other components. A position data receiver 44, such as a global positioning system (GPS) receiver, Galileo satellite system receiver or the like, may be involved in determining the location of the electronic device 10. A local transceiver 46, such as an infrared transceiver and/or an RF transceiver (e.g., a Bluetooth chipset) may be used to establish communication with a nearby device, such as an accessory (e.g., a headset), another mobile radio terminal, a computer or another device. A light sensor 48, such as a photodetector may be used to detect the amount of ambient light present in the environment in which the electronic device 10 is located.

As described above, the digital imaging function 20 may be configured control a camera of the electronic device 10 to image and capture one or more digital images of a scene. The imaging and capturing may be performed by the camera 42 in response to a user command performed at the electronic device 10. As an example, the user may interact with an interface displayed on the display 26 of the electronic device (e.g., by selecting via the touch screen an icon displayed on the interface 26) to initiate imaging of a scene and/or capturing of a digital image. As another example, the user may press a hardware button of the electronic device to initiate imaging of a scene and/or capturing of the digital image.

When imaging a scene with the camera, the digital imaging function 20 may be configured to control the display 26 of the electronic device 10 to display the imaged scene. As such, the display of the electronic device may function as a viewfinder for the camera 42 prior to capture of the digital image. The imaged scene may be displayed as a live video feed from the camera 42 that allows the user of the electronic device 10 to determine the field of view being imaged. As discussed below, while imaging the scene with the camera 42, and prior to capturing the digital image, the digital imaging function 20 may use an image of the scene as a basis to detect the presence of one or more faces in the scene, the identity of each detected face, and/or the social relationship of each recognized individual to the user of the electronic device 10.

Figure 4:
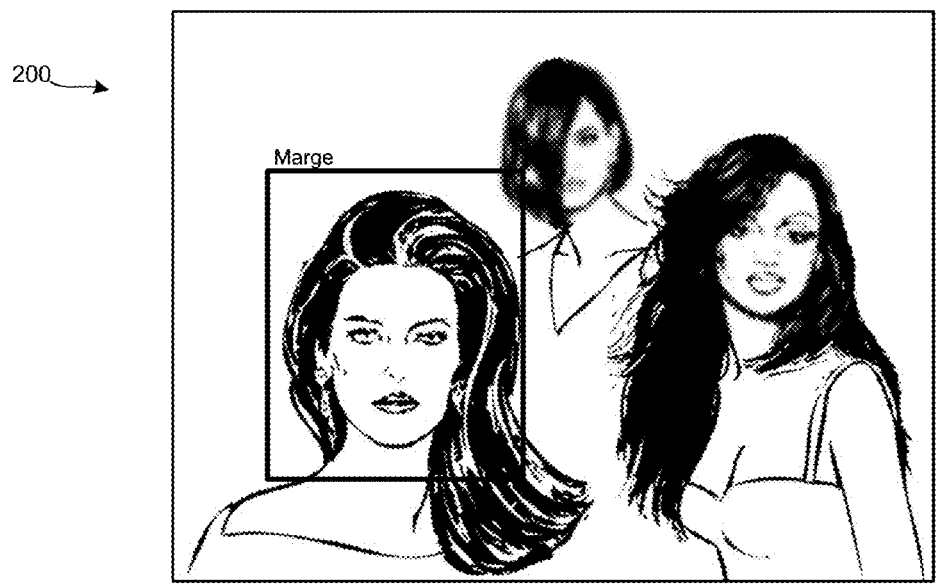
FIGS. 4-6 are exemplary scenes that may be captured as a digital image.
Figure 5:
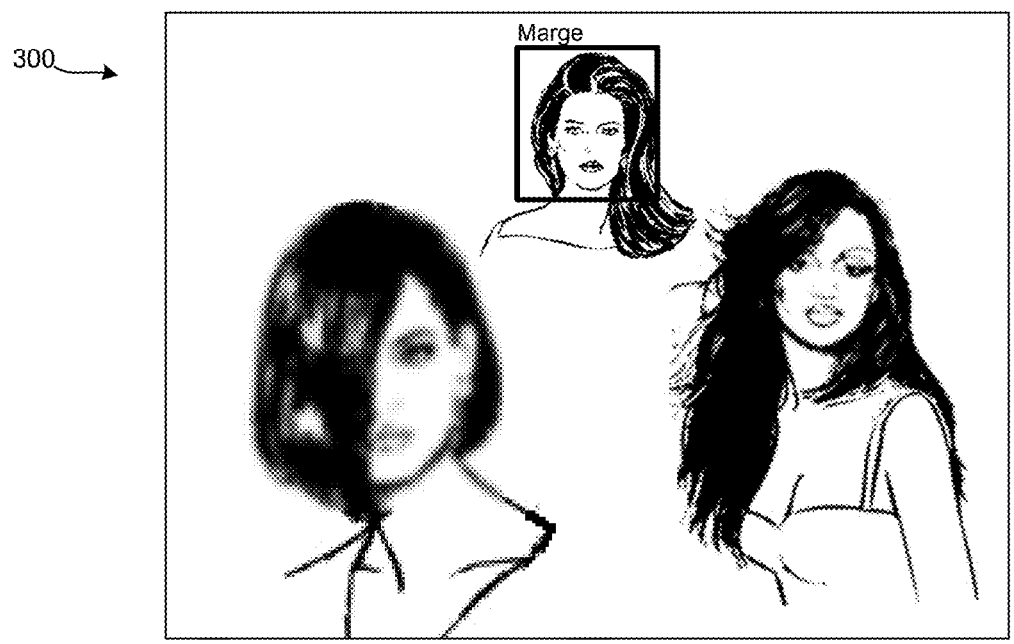
Figure 6:
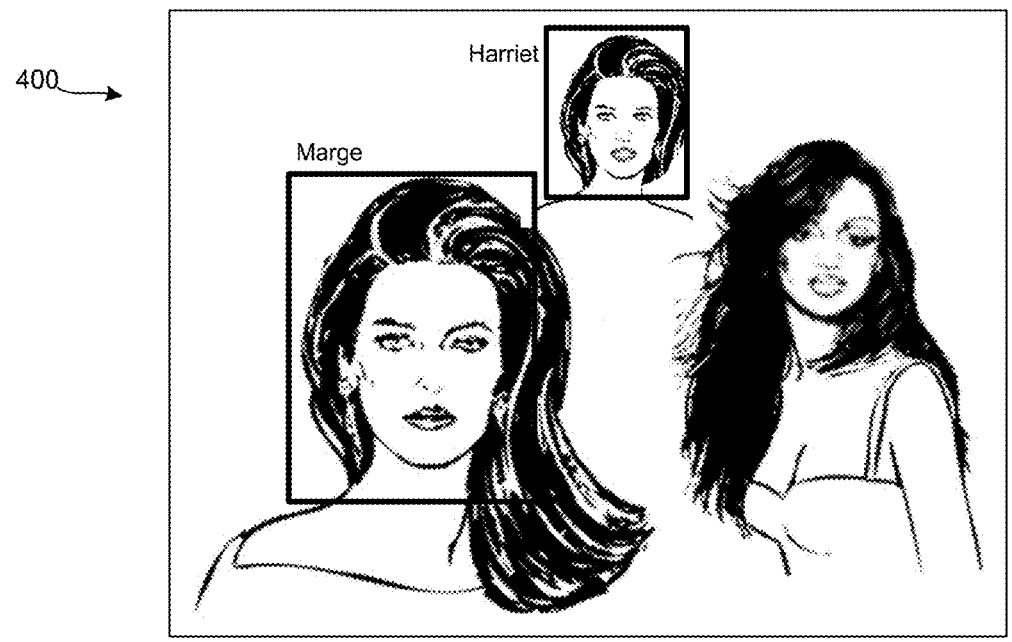

When imaging a scene with the camera 42, the digital imaging function 20 may be configured to include one or more indicators on the displayed image. The one or more indicators may be included on the displayed image to indicate a social relationship of the individual to the user of the electronic device 10. In some embodiments, the one or more indicators may include a shape such as a rectangle, circle, or other suitable shape that outlines and/or surrounds a recognized face. In some embodiments, the one or more indicators may include the name (identity) of a recognized individual. In some embodiments, the one or more indicators may include one or more symbols, shapes, or colors representing the relationship of the user to the recognized individual. For example, depending on the social relationship (e.g., family, relative, co-worker, etc.), a respective symbol may be displayed on the display proximate the face of the individual (e.g., "f" for family, "r" for relative, and "c" for co-worker). As another example, the color and/or shape of the line outlining the individual's face may be different depending on the social relationship (e.g., family member outlined in blue, relative outlined in red, co-worker outlined in green). In some embodiments, the one or more indicators may include symbols representing the social media connections that the recognized individual shares with the user of the electronic device 10. For example, the emblem or trademark of a social media service may appear proximate the face of the recognized individual to indicate the social network by which the user of the electronic device and the recognized individual is connected. If the individual and the user are connected by more than one social media service, more than one emblem or trademark may appear proximate the face of the user. FIGS. 4-6 each show exemplary indicators included on a displayed image (e.g., overlaid on the image). In these exemplary embodiments, each face corresponding to a recognized individual is outlined with a box, and includes the name (identity) of the individual.

A scene imaged by the camera 42 may be captured as a digital image. More specifically, the digital imaging function may be configured to control the camera 42 to capture a digital image (e.g., in response to a user command). In some embodiments, the camera may be controlled to capture a single image. For example, the camera 42 may focus on an object of interest in a scene (e.g., the face of an individual that has a social relationship with the user of the electronic device) and capture the image. In another example, the camera 42 may focus on objects of interest in a scene having the same or essentially the same focal length (e.g., the faces of multiple individuals determined to have a social relationship with the user of the electronic device) and capture the image. In other embodiments, the camera 42 may be controlled to capture multiple images that may collectively form a digital image. For example, the camera 42 may capture images of a scene at different focal lengths that may subsequently be combined in a given manner to form a digital image having multiple focal lengths. Such a process may also be referred to as a "focus stacking" process. In some embodiments, the number of images and/or the respective focal lengths at which the camera 42 captures the multiple images may be dependent on the number and/or position of recognized or detected faces in the scene.

The digital imaging function 20 may be configured to set the focus of a digital image based on a social relationship of one or more individuals in the captured scene to the user of the electronic device 10. In some embodiments, this social relationship may be recognized from the scene prior to capture of the digital image. Accordingly, the focus of the digital image may be set prior to capture. In other embodiments, this social relationship may be recognized after capture of the digital image. Accordingly, the focus of the digital image may be set after capture. Examples of each of these embodiments are described in greater detail below.

In the above embodiments, the digital imaging function 20 may be configured to detect one or more faces present in an image (e.g., the imaged scene or the captured digital image) and recognize an identity of one or more of the detected faces. Based on this recognition, the focus of the digital image may be set.

The digital imaging function 20 may be configured to analyze an image and detect the presence of one or more faces therein. Face detection is well known in the art, and the digital imaging function 20 may be configured to detect a face present in the image using a suitable recognition algorithm. In one exemplary method, known as the Viola-Jones method, the image is divided into rectangular blocks, based on a sum of luminosity values for groups of adjacent pixels, and then grouped to form features. The features within the image are compared against a database of features known to be indicative of a human face. The comparison may involve several iterations to increase face-detection accuracy. In embodiments where the image includes more than one face, the face-detection may be used to detect multiple faces in the digital image.

For each detected face, the digital imaging function 20 may be configured to recognize the identity of an individual having the detected face by determining a social relationship between the recognized individual and the user of the electronic device. This recognition may be performed using facial recognition. Facial recognition algorithms are also well known in the art and commercially available. Such algorithms typically involve the comparison of facial features between the detected face and other detected faces in one or more other digital images.

In some embodiments, the digital imaging function 20 may be configured to perform facial recognition at the electronic device 10. When attempting to recognize a detected face in the digital image, the process may draw from any number of sources for comparison. For example, the electronic device 10 may have stored within the memory 16 a database 21 of individuals and associated facial features. A database 116 may also be stored at the social media server 106. As part of the facial recognition process, the digital imaging function 20 may be configured to request data from the database 116 of the social media server 106 when attempting to recognize a detected face in the digital image. In embodiments where multiple social media servers are connected to the electronic device 10, the digital imaging function 20 may be configured to request data from the databases of a portion of or each of the connected social media servers.

In some embodiments, the digital imaging function 20 may be configured to perform facial recognition by sending an identity request to the social media server 106 and receiving an identity response from the social media server 106. For example, the digital imaging function 20 may send an identity request to the identity recognition function 114 of the social media server 106. The identity request may include an identity of a user of the electronic device 10, as well as attribute information and/or an image including one or more detected faces. The identity recognition function 114 may be configured to compare the one or more detected faces to individuals connected to the user on the social media service (e.g., as part of a facial recognition process), and determine if one or more of the detected faces corresponds to an individual that is socially related to the user. The identity recognition function 114 may be configured to generate an identity response. The identity response may include the identity of each individual that is determined to correspond to a detected face. The identity response may also include information such as the specific relationship of the individual to the user. The identity request may be sent to multiple social media servers (each associated with a respective social media service). The identity recognition function 114 may send the identity response to the digital imaging function 20, and the digital imaging function 20 may receive the identity response.

The digital imaging function 20 may be configured to display one or more indicators on the image (e.g., the imaged scene or the captured image) that is displayed on the display 26 of the electronic device 10. The one or more indicators may be displayed in accordance with the recognized identity of individuals in the scene. As described above, the one or more indicators may include a shape that outlines and/or surrounds a recognized face; the name (identity) of a recognized individual; one or more symbols, shapes, or colors representing the relationship of the user to the recognized individual; and/or symbols representing the social media connections that the recognized individual shares with the user of the electronic device 10. Settings of the one or more indicators (e.g., the manner in which the one or more indicators are displayed on the image) may be set in advance by a user of the electronic device 10. The one or more indicators may allow the user of the electronic device 10 to visualize the relationships recognized by the digital imaging function. The indicators may also allow for the user to confirm and/or remove any recognized identities. For example, if a user does not desire for a recognized individual to be associated with the captured digital image, the digital imaging function may be configured to remove the one or more indicators (e.g., as a result of the user entering a command).

As described above, the digital imaging function 20 may be configured to set the focus of a digital image based on a social relationship of one or more individuals in the captured scene to the user of the electronic device. If a single individual is recognized in the image, the image may be captured/processed with a focal length that is focused on the face of the individual. Similarly, if multiple individuals are recognized in the scene, the image may still be captured/processed with a single focal length if each of the recognized individuals is at the same or essentially the same focal length. In embodiments where multiple individuals are recognized and they are at different respective focal lengths, focusing on each of the recognized individuals may require the capture/processing of a digital image having multiple focal lengths. This digital image may be captured using a focus stacking technique in which two or more images captured having respective focal distances are combined.

In some embodiments, where multiple individuals are recognized and they are at different respective focal lengths, the camera 42 may not be capable of capturing/processing a digital image having multiple focal lengths. That is, the camera 42 may only be capable of capturing/processing digital images with a single focal length. Accordingly, the digital imaging function 20 may be configured to select one of the recognized individuals on which to focus. The digital imaging function may make this selection based on one or more factors. Such factors include, for example, characteristics of the face itself (e.g., prominence of face, position in photo, smiling, direction of eyes, and the like) and/or the recognized individual's relationship to the rest of the image (e.g., number of social media relationships, type of relationship, and the like). In some embodiments, the user of the electronic device 10 may manually chose one of the recognized individuals on which to focus.

FIGS. 4-6 illustrate exemplary images of scenes displayed on the display 26 that may be captured as a digital image. The images shown in FIGS. 4-6 may represent a preview image (e.g., shown on the display 26 prior to capture of the digital image, or shown on the display 26 as part of a post-capture process). In each of the scenes, multiple faces have been detected, and at least one of the detected faces has been recognized as corresponding to an individual having a social relationship with the user of the electronic device 10. The digital imaging function 20 has overlaid indicators in each imaged scene on the face(s) of the recognized individual(s). In these exemplary embodiments, each face corresponding to a recognized individual is outlined with a box, and includes the name of the individual. Furthermore, focus of the image is set in accordance with the recognized social relationship between the individual(s) and the user of the electronic device. In FIG. 4, a recognized individual is in the foreground. Accordingly, the focus is set on the face of the recognized individual in the foreground. In FIG. 5, a recognized individual is in the background. Accordingly, the focus is set on the face of the recognized individual in the background. In FIG. 6, a recognized individual is in the foreground and an additional recognized individual is in the background. Accordingly, the focus is set on both the foreground and the background. It is noted that the image shown in FIG. 6 is for illustrative purposes, and in some embodiments, the focus on both the foreground and the background will be achieved upon capturing and combining a plurality of images in a focus stacking procedure.

Furthermore, as described below with respect to FIG. 9, the images shown in FIGS. 4-6 may instead represent captured images.

Once a digital image is captured, the digital imaging function 20 may be configured to store the digital image on a memory of the electronic device. When an individual is recognized from a detected face, the one or more corresponding indicators of the individual may also be stored in association with the image. For example, the indicator may be stored as metadata within the digital image file. In other embodiments, the digital imaging function may store the digital files (and corresponding indicators) elsewhere, such as on an external storage device (not shown) or a remote server (not shown) of the user of the electronic device 10, or on the server 106 of a social media service. The images may be stored as a part of an album or other digital image library. The album may be facilitated by software on the electronic device 10, or facilitated by a social media service. The digital imaging function may further be configured to share the image (e.g., with the recognized individuals and/or on one or more social media services).

Figure 7:
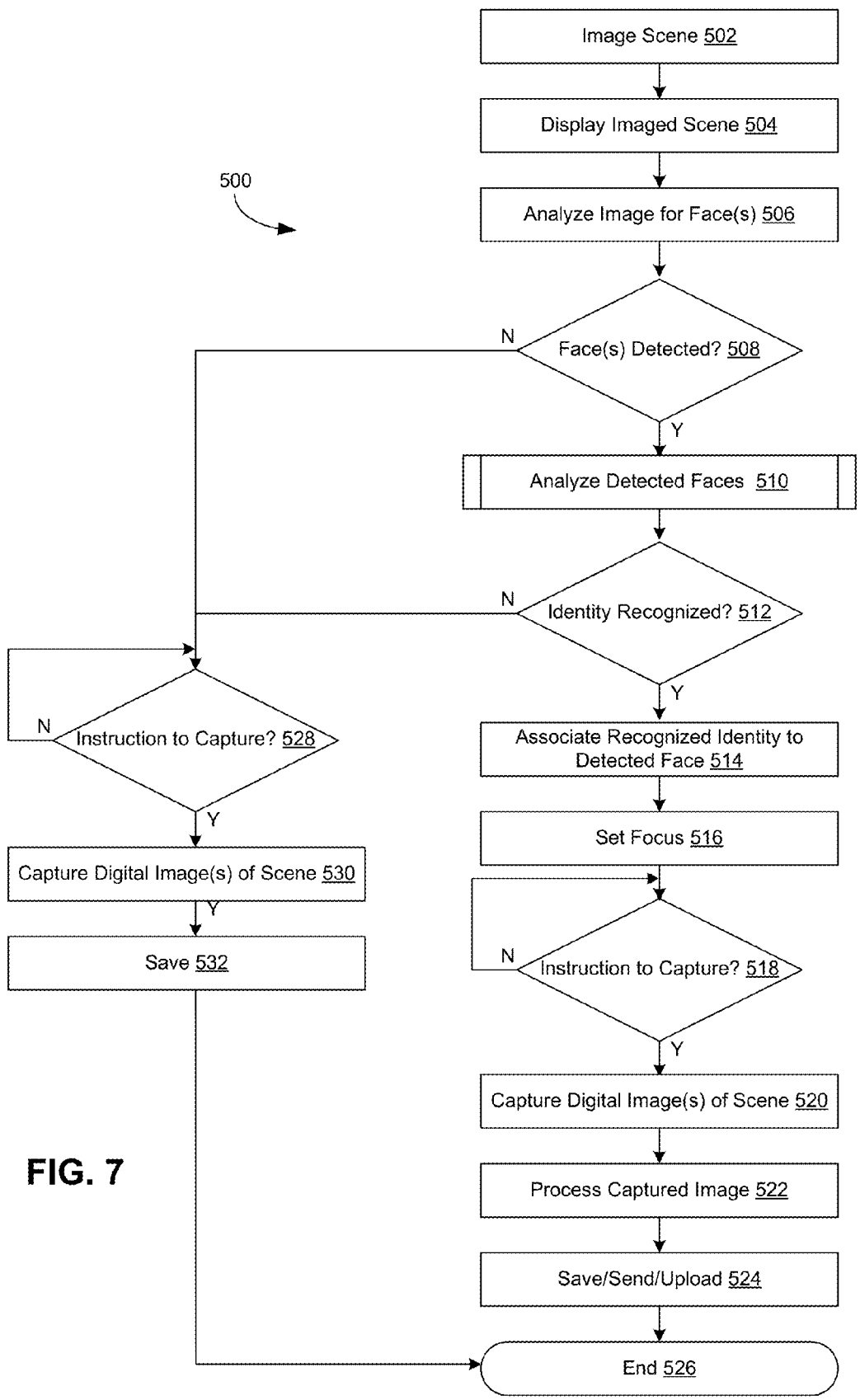
FIGS. 7-9 are flow diagrams representing exemplary methods of setting the focus of a digital image based on social relationship to a user of the electronic device.
Figure 8:
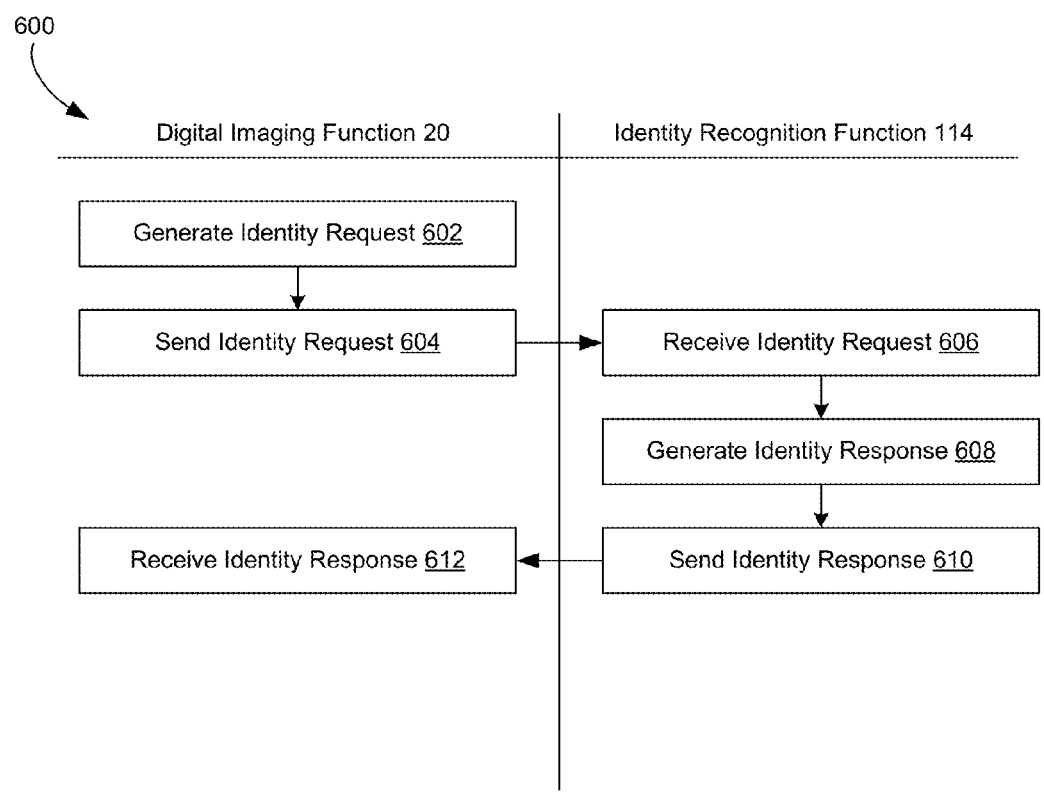
Figure 9:
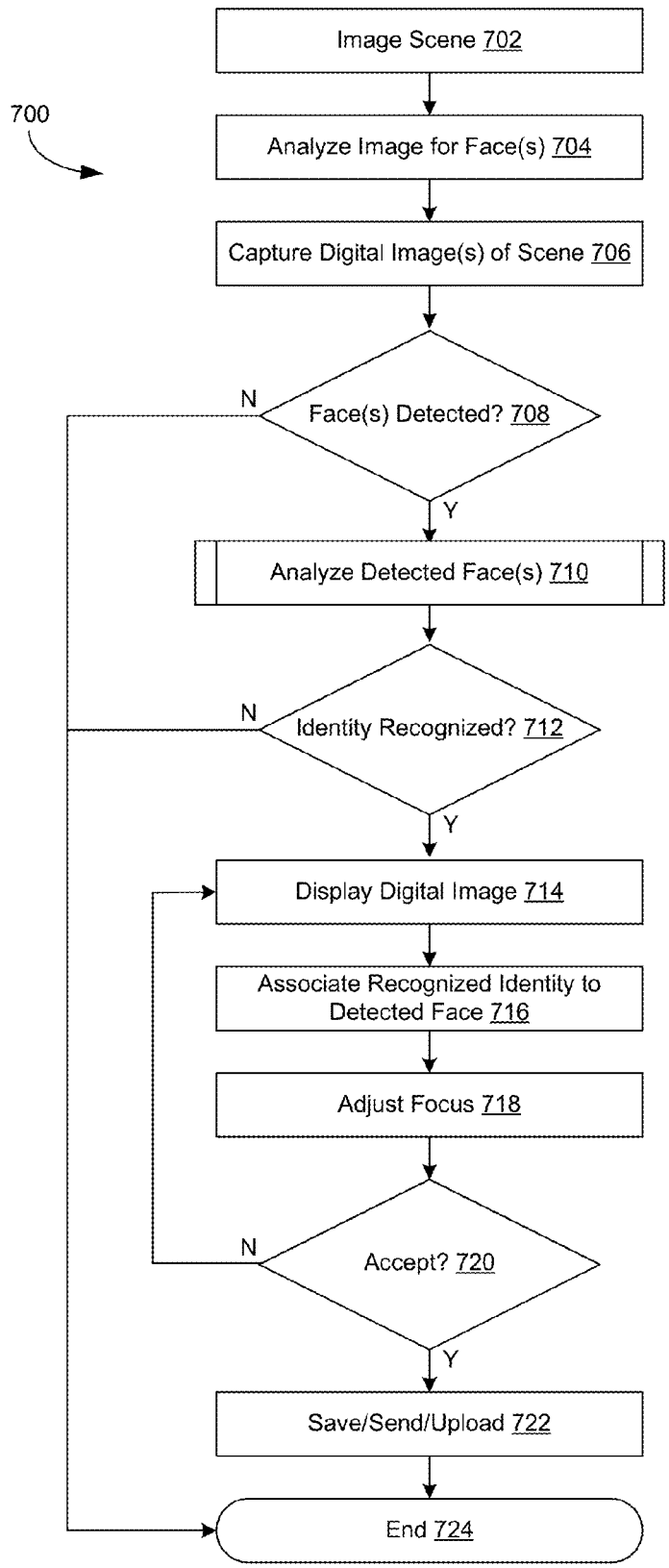

Features of the digital imaging function 20 are exemplified in FIGS. 7-9, which show logical operations for implementing respective exemplary methods of setting a focus of a digital image based on social relationship to a user of an electronic device 10. The exemplary method may be carried out by executing embodiments of the digital imaging function 20 of the electronic device 10 and/or embodiments of the identity recognition function 114 of the social media server 106, for example. Although FIGS. 7 and 8 show specific orders of logical operations, the orders thereof may be changed relative to the order shown. Also, two or more logical operations shown in succession may be executed concurrently or with partial concurrence. Certain logical operations also may be omitted.

FIG. 7 shows logical operations for implementing an exemplary method 500 of focusing a digital image based on social relationship in which the focus of the image is set prior to or concurrent with image capture.

The logical flow may begin at 502 where the digital imaging function 20 controls the camera 42 to image a scene. This may be performed as a result of the user of the electronic device 10 entering a command to initiate an image capture process. For example, the user of the electronic device may select an icon displayed on the interface 26 that initiates the image capture process. As another example, the user may press a hardware button of the electronic device 10 to initiate the image capture process.

At 504, the digital imaging function 20 controls the display 26 to display the imaged scene. The imaged scene may be displayed on the display 26 as a video feed from the camera 42. As such, the display of the electronic device 10 may function as a viewfinder for the camera 42 prior to capture of the digital image. The video feed may allow the user of the electronic device 10 to determine the field of view of a captured digital image. Exemplary reference is made to the imaged scene shown in FIG. 5. In this example, the scene includes images of multiple individuals.

At 506, the digital imaging function 20 analyzes the image to detect faces present in the imaged scene. This may be done by analyzing one of the images (e.g., frames) that make up the feed from the camera 42. As described above, and the digital imaging function may be configured to detect a face present in the scene using any suitable recognition algorithm (e.g., the Viola-Jones method). With exemplary reference to FIG. 5, the digital imaging function 20 may detect three faces present in the imaged scene.

At 508, the digital imaging function 20 determines based on the result of the analysis in 506 if one or more faces are detected in the imaged scene (e.g., based on the result of the face detection process performed by the digital imaging function 20). If it is determined that there are no faces in the imaged scene, the logical flow may proceed to 528 to await an instruction to capture an image. Once an instruction to capture is received, the digital imaging function controls the camera 42 to capture one or more images of the scene (530). The captured image may be saved to the memory 16 of the electronic device 10 (530), and the process may end (530).

If it is determined that there is at least one face present in the image, the logical flow proceeds to 510, where each detected face is analyzed. This analysis may be performed by comparing each detected face to the faces of individuals having a social relationship the user of the electronic device 10. In some embodiments, the digital imaging function 20 may be configured to perform facial recognition at the electronic device 10. When attempting to recognize a detected face in the digital image, the digital imaging function 20 may draw from one or more sources, such as a database 21 stored on the electronic device and/or a database 116 stored on a social media server 106.

In other embodiments, the digital imaging function 20 may be configured to perform facial recognition by sending an identity request to the social media server and receiving an identity response from the social media server. FIG. 8 shows an exemplary process 600 in which the analysis is performed at the social media server. At 602, the digital imaging function 20 generates an identity request. The identity request may include an identity of a user of the electronic device, as well as attribute information and/or one or more images including one or more detected faces from the imaged scene. At 604, the identity request is sent to the identity recognition function 114 of the social media server 106; and at 606 the identity request is received at the identity recognition function 114. At 608, the identity recognition function 114 generates an identity response. More specifically, the identity recognition function 114 compares the one or more detected faces included in the identity request to individuals connected to the user on the social media service (e.g., as part of a facial recognition process), and determines if one or more of the detected faces corresponds to an individual that is socially related to the user. The identity response may include the identity of each individual that is determined by the identity recognition function 114 to correspond to a detected face. The identity response may also include information such as the specific relationship of the individual to the user. At 610, the identity response is sent from the identity recognition function 114 of the social media server 106; and at 612 the identity request is received at the digital imaging function 20.

In still other embodiments, both types of analysis (e.g., at the electronic device 10 and at the social media server 106) may be conducted.

With exemplary reference to FIG. 5, the digital imaging function 20 (alone or in combination with the identity recognition function 114) may determine that the detected face located in the background of the imaged scene is the face of an individual having a social relationship with the user of the electronic device. The identity of an individual is recognized as having the detected face.

With continued reference to FIG. 7, at 512, the digital imaging function determines based on the analysis at 510 if a detected face is recognized as corresponding to an individual having a social relationship with the user of the electronic device 10. The determination may be based on the result as determined by the digital imaging function 20 and/or provided by the social media server. If it is determined that there are no recognized identities, the process proceeds to 528 to await an instruction to capture an image. Once an instruction to capture is received, the digital imaging function controls the camera 42 to capture one or more images of the scene (530). The captured image may be saved (532), and the process may end.

If it is determined that there is at least one recognized identity, the logical flow proceeds to 514 where the digital imaging function 20 associates each recognized identity with a detected face. The association may include the display of one or more indicators on the image displayed on the display 26 of the electronic device 10 in accordance with the recognized identity of individuals in the scene. As described above, the one or more indicators may include a shape that outlines and/or surrounds a recognized face; the name (identity) of an recognized individual; one or more symbols, shapes, or colors representing the relationship of the user to the recognized individual; and/or symbols representing the social media connections that the recognized individual shares with the user of the electronic device. With exemplary reference to FIG. 5, the face in the background corresponding to a recognized individual is outlined with a box, and includes the name of the individual.

At 516, the digital imaging function 20 may be configured to set the focus of a digital image based on a social relationship of one or more individuals in the captured scene to the user of the electronic device. With exemplary reference to FIG. 5, the individual is in the background. Accordingly, the focus is set on the face of the recognized individual in the background.

At 518, the digital imaging function 20 awaits an instruction to capture the digital image. Once an instruction to capture is received, the process proceeds to 520 and the digital imaging function 20 controls the camera 42 to capture one or more images of the scene. The number of images captured may be dependent on the focus set. In the example of FIG. 5, only one individual is recognized. Accordingly, a single digital image may be taken with the focus on the face of the recognized individual. In other embodiments (e.g., FIG. 6), the focus setting may dictate the number of digital images that are captured.

At 522, the digital imaging function 20 may process the digital images. Processing may include focus stacking, stitching, or any other post-capture processing. The processing may be optionally performed. For example, the digital image captured of the image shown in FIG. 5 may not be subjected to processing, as only one individual was recognized in the image and the focus is set on the face of the recognized individual in the background. In other embodiments (e.g., as exemplified in FIG. 6), post-capture processing may be performed.

At 524, the digital imaging function 20 may save, send, and/or upload the captured digital image. In some embodiments, the captured digital image may be saved to the memory 16 of the electronic device 10, an external storage device, a remote server of the user of the electronic device, or another suitable storage device. In some embodiments, the captured digital image may be uploaded to one or more social media services (e.g., via the social media server). In an example, the captured digital image may be uploaded to each social media service to which the user of the electronic device is associated. In another example, the captured digital image may be uploaded to a subset of social media services to which the user of the electronic device is associated. This subset may be the social media services specifically chosen by the user, or may be those social media services on which the recognized individual(s) is connected to the user of the electronic device 10. In some embodiments, the captured digital image may be shared with the recognized individual(s) in the image via one or more social media services and/or by directly sending the captured digital image to the recognized individual(s) (e.g., via text, email, and the like).

At 526, the process ends.

FIG. 9 shows logical operations for implementing an exemplary method 700 of focusing a digital image based on social relationship in which the focus of an already-captured image is set.

The logical flow may begin at 702 where the digital imaging function 20 of the electronic device 10 controls the camera to capture image a scene. This may be performed as a result of the user of the electronic device 10 entering a command to initiate an image capture process. For example, the user of the electronic device may select an icon displayed on the interface 26 that initiates the image capture process. As another example, the user may press a hardware button of the electronic device 10 to initiate the image capture process. Exemplary reference is made to the scene shown in FIG. 6. In this example, the scene may include images of multiple individuals.

At 704, the digital imaging function 20 analyzes the image to detect faces present in the imaged scene. This may be done by analyzing one of the images (e.g., frames) that make up the feed from the camera. As described above, and the digital imaging function may be configured to detect a face present in the scene using any suitable recognition algorithm (e.g., the Viola-Jones method). With reference to FIG. 6, the digital imaging function 20 may detect three faces present in the imaged scene.

At 706, the digital imaging function controls the camera 42 to capture one or more images of the scene. The number of images captured may be dependent on the number of faces detected in the image and/or the location/focal position of such faces in the image. In the example of FIG. 6, three faces are detected and each face is located in the image at a different respective focal length. Accordingly, three digital images may be taken, each image captured at a different focal length and focused on a detected face.

At 708, the digital imaging function 20 determines based on the result of the analysis in 704 if one or more faces are detected in the imaged scene (e.g., based on the result of the face detection process performed by the digital imaging function 20). If it is determined that there are no faces in the imaged scene, the logical flow may proceed to 724 and end.

If there is at least one face present in the image, the logical flow proceeds to 710, where each detected face is analyzed. This analysis may be performed by comparing each detected face to the faces of individuals having a social relationship the user of the electronic device. In some embodiments, the digital imaging function 20 may be configured to perform facial recognition at the electronic device 10. When attempting to recognize a detected face in the digital image, the digital imaging function 20 may draw from one or more sources, such as a database 21 stored on the electronic device 10 and/or a database 116 stored on a social media server 106. In other embodiments, the digital imaging function 20 may be configured to perform facial recognition by sending an identity request to the social media server 106 and receiving an identity response from the social media server 106. Such process may be performed in accordance with the process 600 shown in FIG. 8, described above. In still other embodiments, both types of analysis may be conducted.

With exemplary reference to FIG. 6, the digital imaging function 20 (alone or in combination with the identity recognition function 114) may determine that the detected face located in the background of the imaged scene is the face of an individual having a social relationship with the user of the electronic device. In addition, the digital imaging function 20 (alone or in combination with the identity recognition function 114) may determine that the detected face located in the foreground of the imaged scene is the face of another individual having a social relationship with the user of the electronic device 10.

At 712, the digital imaging function determines based on the analysis at 710 if a detected face is recognized as corresponding to an individual having a social relationship with the user of the electronic device 10. The determination may be based on the detection result as determined by the digital imaging function 20 and/or provided by the social media server 106. If it is determined that there are no recognized identities, the process may proceed to 724 and end.

If it is determined that there is at least one recognized identity, the logical flow proceeds to 714 where the digital imaging function 20 controls the display 26 to display the imaged scene. In an embodiment where the camera captures more than one image of the scene, one of the images may be displayed on the display 26.

At 716, the digital imaging function 20 associates each recognized identity with a detected face. The association may include the display of one or more indicators on the captured image displayed on the display 26 of the electronic device 10 in accordance with the recognized identity of individuals in the scene. As described above, the one or more indicators may include a shape that outlines and/or surrounds an recognized face; the name (identity) of an recognized individual; one or more symbols, shapes, or colors representing the relationship of the user to the recognized individual; and/or symbols representing the social media connections that the recognized individual shares with the user of the electronic device. With exemplary reference to FIG. 6, the face in the background corresponding to a recognized individual is outlined with a box, and includes the name of the individual. Similarly, the face in the foreground corresponding to another recognized individual is outlined with a box, and includes the name of the individual.

At 718, the focus of the digital image is set. The digital imaging function 20 may be configured to set the focus of a digital image based on a social relationship of one or more individuals in the captured scene to the user of the electronic device. With exemplary reference to FIG. 6, one individual having a social relationship with the user of the electronic device is in the background of the image, and another individual having a social relationship with the user of the electronic device is in the foreground of the image. Accordingly, the focus is set on the faces of the recognized individual in the background. This may be performed by processing such as focus stacking of the captured images. In other embodiments, where only one individual is recognized or where recognized individuals are located at the same or substantially the same focal distance, only one of the captured images may be utilized.

At 720, the digital imaging function 20 awaits a decision as to whether the focus-adjusted digital image is accepted by the user. If the user does not accept the image (e.g., and would prefer that it be focused in another manner), the process may return to 714. If the user accepts the image, the process may proceed to 722 where the digital imaging function 20 may save, send, and/or upload the captured digital image. In some embodiments, the captured digital image may be saved to the memory 16 of the electronic device 10, an external storage device, a remote server of the user of the electronic device, or another suitable storage device. In some embodiments, the captured digital image may be uploaded to one or more social media services (e.g., via the social media server). In an example, the captured digital image may be uploaded to each social media service to which the user of the electronic device is associated. In another example, the captured digital image may be uploaded to a subset of social media services to which the user of the electronic device is associated. This subset may be the social media services specifically chosen by the user, or may be those social media services on which the recognized individual(s) is connected to the user of the electronic device. In some embodiments, the captured digital image may be shared with the recognized individual(s) in the image via one or more social media services and/or by directly sending the captured digital image to the recognized individual(s) (e.g., via text, email, and the like).

At 722, the process ends.

Although certain embodiments have been shown and described, it is understood that equivalents and modifications falling within the scope of the appended claims will occur to others who are skilled in the art upon the reading and understanding of this specification.

What is claimed is:

1. A method of setting a focus of a digital image based on social relationship to a user of an electronic device, comprising:
    imaging a scene with a camera of the electronic device;
    detecting, with a processing device of the electronic device, a plurality of faces present in an imaged scene, the plurality of faces being at different focal lengths;
    recognizing an identity of an individual having a face from among the plurality of detected faces by determining, with the processing device, that the face is the face of an individual having a social relationship with the user of the electronic device;
    recognizing an identity of an additional individual as having another face from among the plurality of faces by determining, with the processing device, that the another face is the face of an additional individual having a social relationship with the user of the electronic device;
    setting, with the processing device, the focus of the camera to a first focal length to focus on the face of the recognized individual;
    capturing, with the camera, a first image with the focus on the face of the recognized individual;
    setting, with the processing device, the focus of the camera to a second focal length different than the first focal length to focus on the face of the recognized additional individual;
    capturing, with the camera, a second image with the focus on the face of the recognized additional individual; and
    combining the first image and the second image to create the digital image with focus on the face of the recognized individual and focus on the face of the recognized additional individual.

2. The method of claim 1, wherein the identity of the individual having the detected face is recognized using a database of social relationships stored on the electronic device.

3. The method of claim 1, wherein the identity of the individual having the detected face is recognized using a database of social relationships stored on a social media server, and the determining comprises:
    sending an identity request from the electronic device to the social media server, the identity request comprising information of the detected face; and
    receiving at the electronic device an identity response from the social media server, the identity response comprising the identity of the individual having the detected face.

4. The method of claim 3, wherein the identity request comprises an image including the one or more detected faces.

5. The method of claim 1, further comprising storing the identity of the recognized individual as metadata to the digital image.

6. The method of claim 1, further comprising displaying on the imaged scene proximate the detected face, information relating to the social relationship between the recognized individual and a user of the electronic device.

7. The method of claim 1, further comprising displaying on the digital image proximate the detected face of the recognized individual, information representing a social media connection between the recognized individual and a user of the electronic device.

8. A method of setting a focus of a digital image based on social relationship to a user of an electronic device, comprising:
    imaging a scene with a camera of the electronic device;
    detecting, with a processing device of the electronic device, a plurality of faces present in the imaged scene, the plurality of faces being at different focal lengths;
    capturing a plurality of images with a camera of the electronic device, each image captured at a different respective focal length, each image focused on at least one of the detected faces;
    recognizing an identity of an individual having one of the detected faces in the plurality of captured images by determining, with the processing device, that the detected face is the face of an individual having a social relationship with the user of the electronic device; and
    setting the focus of the digital image by using one or more of the captured plurality of images to focus on the face of the recognized individual.

9. The method of claim 8, wherein the identity of the individual having one of the detected faces is recognized using a database of social relationships stored on the electronic device.

10. The method of claim 8, wherein the identity of the individual having one of the detected faces is recognized using a database of social relationships stored on a social media server, and the determining comprises:
    sending an identity request from the electronic device to the social media server, the identity request comprising information of the detected faces; and
    receiving at the electronic device an identity response from the social media server, the identity response comprising the identity of the individual having one of the detected faces.

11. The method of claim 10, wherein the identity request comprises an image including the one or more detected faces.

12. The method of claim 8, further comprising storing the identity of the recognized individual as metadata to the digital image.

13. The method of claim 8, wherein the method further comprises recognizing an identity of an additional individual as having another face from among the plurality of faces in the plurality of captured images by determining, with the processing device, that the another face is the face of an additional individual having a social relationship with the user of the electronic device; and the setting the focus comprises combining two of the plurality of images to create the digital image with focus on the face of the recognized individual and on the face of the recognized additional individual.

14. The method of claim 8, further comprising displaying on the imaged scene proximate the detected face, information relating to the social relationship between the recognized individual and a user of the electronic device.

15. The method of claim 8, further comprising displaying on the digital image proximate the detected face of the recognized individual, information representing a social media connection between the recognized individual and a user of the electronic device.

16. An electronic device, comprising:

a camera; and a processing device that executes a digital imaging function configured to set a focus of a digital image based on social relationship to a user of an electronic device by:

imaging a scene with the camera;

detecting a plurality of faces present in an imaged scene, the plurality of faces being at different focal lengths;

recognizing an identity of an individual having a face from among the plurality of detected faces by determining that the face is the face of an individual having a social relationship with the user of the electronic device;

recognizing an identity of an additional individual as having another face from among the plurality of faces by determining, with the processing device, that the another-face is the face of an additional individual having a social relationship with the user of the electronic device;

setting the focus of the camera to a first focal length to focus on the face of the recognized individual;

capturing, with the camera, a first image with the focus on the face of the recognized individual;

setting the focus of the camera to a second focal length different than the first focal length to focus on the face of the recognized additional individual;

capturing, with the camera, a second image with the focus on the face of the recognized additional individual; and combining the first image and the second image to create the digital image with focus on the face of the recognized individual and focus on the face of the recognized additional individual.

17. The electronic device of claim 16, wherein the identity of the individual having the detected face is recognized using a database of social relationships stored on the electronic device.

18. The electronic device of claim 16, wherein the identity of the individual having the detected face is recognized using a database of social relationships stored on a social media server, and the processing device executes the digital imaging function further configured to:

send an identity request from the electronic device to the social media server, the identity request comprising information of the detected face; and receive at the electronic device an identity response from the social media server, the identity response comprising the identity of the individual having the detected face.

19. The electronic device of claim 18, wherein the identity request comprises an image including the one or more detected faces.

20. The electronic device of claim 16, wherein the processing device executes the digital imaging function further configured to display on the digital image proximate the detected face of the recognized individual, information representing a social media connection between the recognized individual and a user of the electronic device.

\* \* \* \* \*